United States Patent [19]

Eheler et al.

[11] Patent Number: 5,080,939
[45] Date of Patent: Jan. 14, 1992

[54] BOUGH HOLDER

[76] Inventors: Lois J. Eheler, 137 Lyman St., Park Falls, Wis. 54552; Robert W. Lamken, 7508 Cty. Hwy. J., Schofield, Wis. 54476

[21] Appl. No.: 512,174
[22] Filed: Apr. 20, 1990

Related U.S. Application Data

[63] Continuation-in-part of Ser. No. 162,018, Feb. 29, 1988.
[51] Int. Cl.$^5$ .............................................. A47G 33/00
[52] U.S. Cl. ...................................... 428/10; D11/120; 428/27; 493/958
[58] Field of Search .............. D11/119, 120; 248/27.8; 362/122; 428/10, 27; 493/957, 958

[56] References Cited

U.S. PATENT DOCUMENTS

| | | | |
|---|---|---|---|
| 600,313 | 3/1898 | Hayes | 428/27 |
| 2,227,187 | 12/1940 | Hanson | 428/8 X |
| 2,740,218 | 4/1956 | Miller | 428/10 |
| 2,761,233 | 9/1956 | Brown | 428/10 X |
| 2,849,822 | 9/1958 | Bachman | 428/10 X |
| 3,591,442 | 7/1971 | Matesi | 428/10 |
| 4,100,316 | 7/1978 | Lackey | 428/10 |
| 4,133,922 | 1/1979 | Smith | 428/10 |
| 4,418,432 | 12/1983 | Vidal | 428/10 X |

OTHER PUBLICATIONS

Pages 99 and 959, The Title page and Verso of the Title Page of, "Webster's Seventh New Collegiate Dictionary", G.+C. Merriam Company, Publishers Springfield, Massachusetts, U.S.A.

Primary Examiner—Henry F. Epstein
Attorney, Agent, or Firm—Thomas D. Wilhelm

[57] ABSTRACT

Bough holders are disclosed, for holding boughs in place in wreaths and other decorative display articles. The bough holder comprises a pocket for receiving the bough stems, and pocket fastening means which are adapted to receive a wrap of an intermediate portion of a continuous strand fastener, without necessarily employing an end of the strand fastener in making the wrap. The pocket typically includes a bottom, and walls, extending upwardly from the bottom, to a top. Typical pocket fastening means in a plurality of buttons extending along the length of the holder, and extending from the walls, whereby the strand fastener can be sequentially wrapped around the pocket fastening means, to thereby hold boughs in place in the pocket.

8 Claims, 4 Drawing Sheets

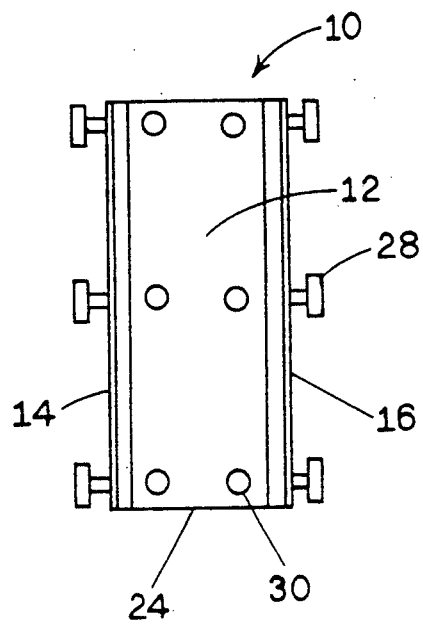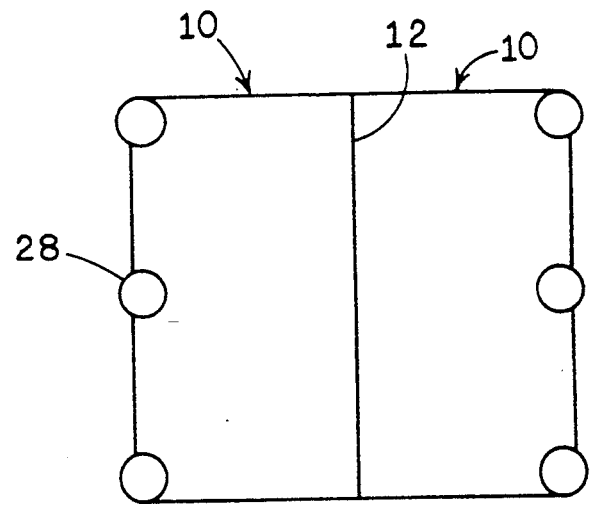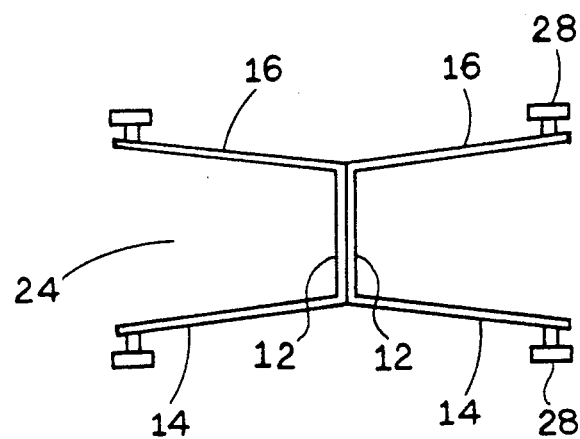

BOUGH HOLDER

This is a continuation-in-part of application Ser. No. 162,018, filed Feb. 29, 1988.

BACKGROUND OF THE INVENTION

This invention relates especially to wreaths, and like decorative items made with evergreen boughs, such as balsam boughs. Such decorations are used, for example, as Christmas decorations, and for grave side ceremonies. The shapes commonly employed in such decorations include the round wreath, the Cross, and the grave blanket.

The round wreath, as conventionally made, is built on a round wire ring frame which is available in various sizes. The Cross, as conventionally made, is built on a frame made of two wooden slats which have been nailed together.

The processes for making decorative items with the wire rings, or the nailed slats, are the same. A handful of bough branches are placed on the ring or slat, and are manually held in place while a piece of wire is wound tightly around the boughs, and the ring or slat. Another handful of bough branches is placed 3 to 4 inches down the ring or slat from the first handful, and the wire is tightly wrapped around them. This process is repeated until the circumference of the ring, or the elongated surface of the slats, has been covered with boughs.

Using the above process, each wrapping of the wire around, for example, the round wire frame requires that the end of the wire be passed under the wire frame and through the central opening defined by the round wire frame. Accordingly, the worker is required to regularly position the article being built away from any solid working surface in order to wrap the wire around the boughs which are being secured to the frame at that point in time.

The requirements for passing the end of the wire entirely around the frame are less demanding for construction of the Cross, wherein the end of the wire can be maneuvered around the end of the cross, but the requirement to wrap the wire around the frame is still cumbersome.

In making the grave blanket, a woven wire is typically used as the frame, and extends generally the full length and width of the blanket, typically four feet wide by seven feet long. The boughs are woven into the frame and secured with wire, about one entire surface of the frame, about its length and width. This, too, is a slow, labor intensive process.

It is an object of this invention to provide a bough holder which facilitates securing the boughs to the holder, and thereby making decorative bough display articles.

It is an object to provide a bough holder which has a receiving pocket dimensioned to receive the bough branches and to confine them while the boughs themselves are being secured to the bough holder.

It is another object to provide the bough holder with fastening means on the receiving pocket, whereby the fastening means are adapted to receive wraps of intermediate portions of a continuous strand fastener, and thereby to secure the boughs to the bough holder, without having to maneuver the strand fastener behind the bough holder.

It is yet another object to provide such a bough holder which is easy and simple to work with, and which can be employed to produce the decorative bough display articles faster and with less stress and strain on the worker.

It is still another object to provide a bough holder which employs fewer boughs in the construction of a display article.

SUMMARY OF THE DISCLOSURE

In one family of embodiments of the invention, some of the objectives are obtained in a bough holder, for making decorative displays with evergreen boughs, wherein the bough holder comprises a pocket, the pocket generally comprising an elongated channel structure, the channel structure having a bottom, walls extending upwardly from the bottom, and a top. The interior of the channel structure is accessible, for placing articles therein, through the top. The bough holder also comprises a plurality of fastening means on the walls, the fastening means being adapted to receive a wrap of an intermediate portion of a continuous strand fastener.

Preferably, the fastening means comprise buttons extending from the walls.

In preferred embodiments, the walls comprise opposing side walls, and ones of the buttons on the opposing side walls extend away from each other.

Also in preferred embodiments wherein the walls comprise opposing side walls, the angle between the bottom of the pocket and extension of portions of the general outline of the cross-sections of the side walls, as measured on the inside of the channel, is at least as great adjacent the bottom as adjacent the top.

In another family of embodiments, the bough holder comprises a wedging pocket. The wedging pocket comprises an elongated channel structure. The channel structure has a bottom, side walls extending upwardly from the bottom, and a top. The interior of the channel structure is accessible, for placing article therein, through the top. The angle between the bottom and extensions of portions of the general outline of the cross-section of the side walls, as measured on the inside of the channel, is at least as great adjacent the bottom as adjacent the top.

In yet another family of embodiments, the invention comprehends a bough holder assembly. The assembly comprises a plurality of pockets arranged in an array. Each pocket has an elongated dimension thereof, dimensioned to receive evergreen boughs, and comprising a bottom, walls extending upwardly from the bottom, a top, and a plurality of fastening means on the walls, the fastening means being adapted to receive a wrap of an intermediate portion of a continuous strand fastener, whereby the continuous strand fastener can be used to hold a bunch of boughs to the bough holder. The bough holder assembly further comprises elongated strand fastening means extending between the plurality of elongated pockets, and securing the pockets to each other in the array. Preferably, the strand fastening means is secured to the fastening means on the walls of respective ones of the pockets, and extends between the pockets, and thereby establishes the array.

In still another family of embodiments, the invention comprehends another bough holder assembly which comprises first and second bough holders, each bough holder having (i) a bottom, (ii) walls extending upwardly from the bottom, and (iii) a top, each bough holder comprising elongated dimensions along the bottom and walls, and thus comprising a channel. The channel is dimensioned to receive evergreen boughs. The first and second bough holders are arranged with the bottoms of the bough holders disposed toward each other, and the tops of the bough holders disposed away from each other, the first and second bough holders being firmly held to each other. Preferably, the first and second bough holders each comprise fastening means on the walls, the fastening means being adapted to receive a wrap of an intermediate portion of a continuous strand fastener, the first and second bough holders being secured to each other by strand fastener means extending between the fastening means on, the first bough holder and the fastening means on the second bough holder, whereby the first and second bough holders are securely held to each other.

BRIEF DESCRIPTION OF THE DRAWINGS

FIG. 5 is a relatively short bough holder of the invention, having a straight-shaped wedging pocket.

FIG. 6 is a side view of an assembly of two bough holders of FIG. 5, assembled in bottom-to-bottom configuration.

FIG. 7 is an end view of the assembly of FIG. 6.

DETAILED DESCRIPTION OF THE ILLUSTRATED EMBODIMENTS

Figure 1:
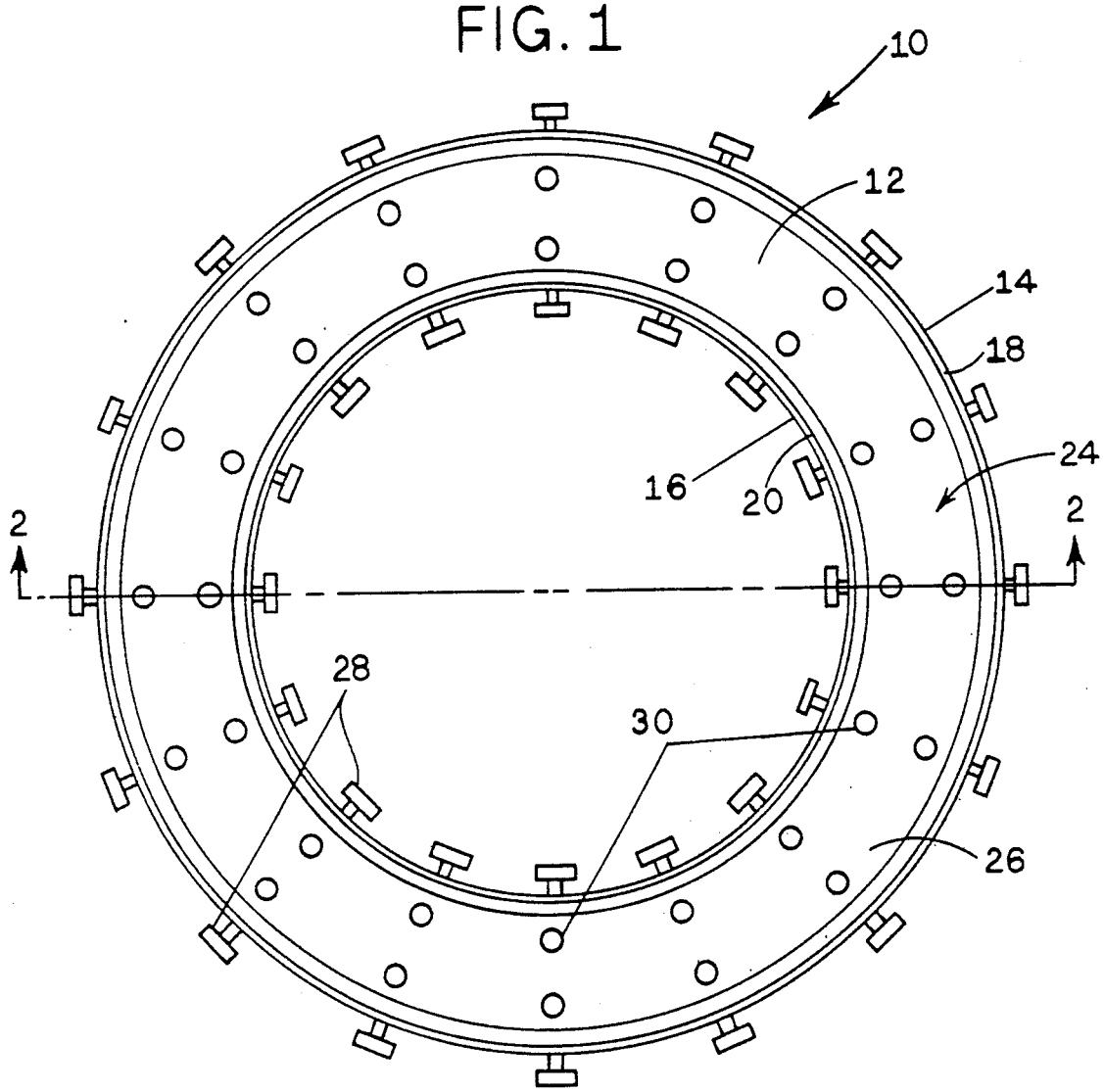
FIG. 1 is a top view of a bough holder of this invention, the bough holder having a ring-shaped wedging pocket.
Figure 2:
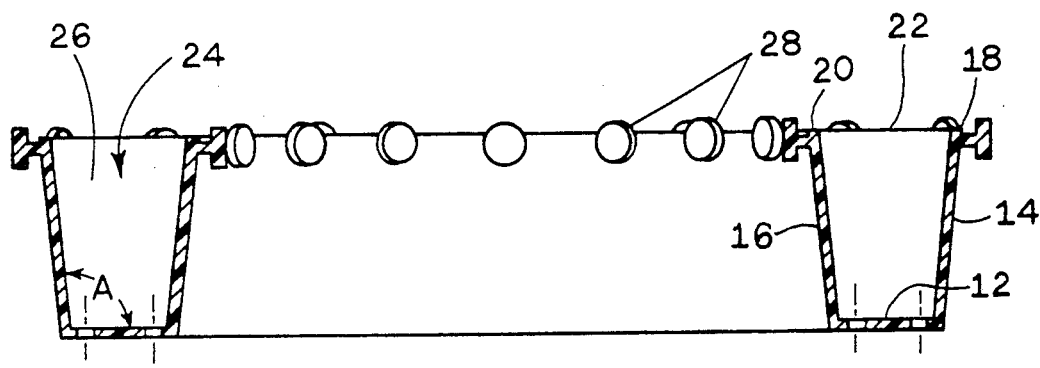
FIG. 2 is a cross-section of the bough holder of FIG. 1, and is taken along 2-2 of FIG. 1.

FIGS. 1 and 2 show an annular bough holder of the invention, generally designated as 10. The structure of the bough holder generally comprises a bottom 12, an inner upstanding wall 16 extending upwardly from bottom 12, and an outer upstanding wall 14 extending upwardly from bottom 12. Walls 14 and 16 have corresponding tops 18 and 20 which, in combination, define the top 22 of the bough holder. The combination of bottom 12 and walls 14 and 16 defines a pocket 24 comprising an elongated channel 26. Fastening buttons 28 extend from walls 14 and 16, and away from each other. Buttons 28 are typically about 2 inches apart on each of walls 14 and 16. Thus, there are 40 buttons on a ring-shaped bough holder 13 inches in diameter. When boughs 34 are on such a 13 inch diameter holder, it will become a 24-inch wreath, as about 6 inches of boughs hang out on the tops 18,20 of walls 14, 16. Pairs of holes 30 are spaced about 2 inches apart along the length of bottom 12.

Figure 3:
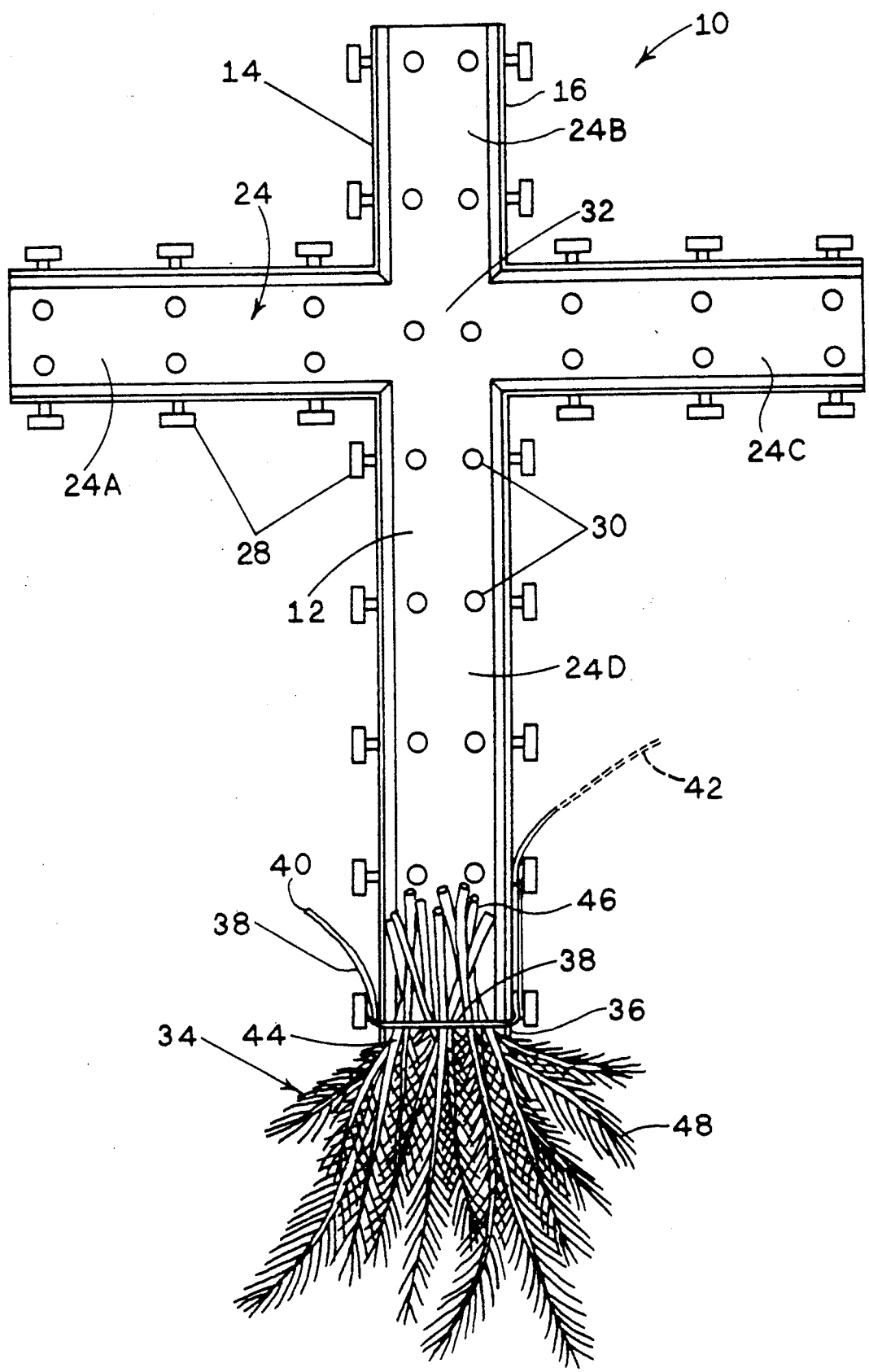
FIG. 3 is a top view of a bough holder having a cross-shaped wedging pocket, and showing one handful of boughs strapped to the bough holder with a suitable strapping.

FIG. 3 illustrates a similar bough holder, wherein the pocket 24 is shaped as a cross, wherein channel 26 is comprised of elongated pockets 24A, 24B, 24C, and 24D which are joined at intersection 32. A handful of boughs 34 is shown emplaced at the end 36 of pocket 24D, and held in place by strand fastener 38. Strand fastener 38 has a first end designated 40 and an indefinite length indicated by the dashed lines 42.

The bough holders of this invention can be made in a variety of basic sizes and shapes. Typical basic structures will be the round wreath base illustrated in FIGS. 1 and 2, and straight sections such as used on the Cross of FIG. 3. Structures having other shapes can be made by joining together elements of the basic structures. For example, half of a circle can be joined with a straight section to make a candy cane.

The channel 26 is preferably about 1.125 inches deep, from top 22 to bottom 12 and is nominally 2 inches wide between walls 14 and 16 at top 22. As seen in FIG. 2, walls 14 and 16 taper toward each other from top 22 to bottom 12, whereby they function to wedge the stems of the boughs together as the stems are pushed into the pocket 24. In order for the walls 14 and 16 to perform their wedging function, and as seen in FIG. 2, the angle "A" between bottom 12 and extensions of portions of the general outline of the cross-sections of walls 14 and 16, as measured on the inside of channel 26, is at least as great adjacent bottom 12 as adjacent to 22.

Buttons 28 are conveniently located about 2 inches apart along each of the walls 14 and 16, and are positioned ¼ inch down from tops 18 and 20 of walls 14 and 16 respectively. Buttons 28, as illustrated, are 3/16 inch long, whereby they extend about 3/16 inch from the corresponding wall 14 or 16. The buttons, as illustrated, are ⅛ inch diameter at the head.

The pairs of holes 30, as illustrated, for example, in FIGS. 1 and 3, are spaced about 2 inches apart along channel 26. Thus holes 30 are conveniently positioned to facilitate hanging the decorative articles from essentially any part of the base 12 of bough holder. Similarly, the holes 30 serve as a supplementary anchoring locus for holding other decorative articles to the article being assembled.

The bough holder is used as follows, and with reference to FIG. 3. First, bough branches are cut from an appropriate tree, for example balsam. The branches are called boughs. The branches are then sized to a length of about 7 to 8 inches long. The bough holder 10 is placed on a table. A handful of boughs—about 7 boughs to a handful —are placed in the holder at the starting location such as at the end 36 of channel 26 in FIG. 3. The handful of boughs is positioned in the channel 26 such that the strand fastener 38 will cross the handful, between two buttons 28 on walls 14 and 16, at the wrist 44 of the handful. Wrist 44 is defined between the stems 46 and the forked, needle covered portions 48 of the boughs 34, which generally extend from the stems. The stems 46 generally lay in the bottom of the holder. The needle covered portions 48 are generally wider than the stems 46, so they lay on the tops 20 and 22 of walls 14 and 16, and don't fall into channel 26.

Once the handful of boughs is in place on the bough holder 10, with the wrist 44 adjacent a pair of buttons 28, strand fastener 38 is secured to one of the buttons 28, e.g. the button on wall 14, is extended across wrist 44 of the handful of boughs, and is secured to the corresponding button 28 on wall 16. The strand fastener 38 is laced to the buttons 28, e.g. by tightly wrapping the strand fastener 38 about each respective button a plurality of times, or by use of knots, whereby the strand fastener is secured to the buttons, and whereby the handful of boughs is held in the channel 26.

The strand fastener 38 is then wrapped around the next (third) button 28 as illustrated in FIG. 3. Another handful of boughs is then placed on the holder about 3-4 inches down from the strand fastener 38 where it crossed the wrist 44 of the first handful of boughs. Strand fastener 38 is then brought across the wrist of the second handful of boughs, from the appropriate button 28, and is secured to the corresponding button on the opposite wall. This process of placing handfuls of boughs in the channel, and securing them with the strand fastener across the wrist, is repeated until the length of channel 26 has been filled as desired. Since each handful lays, in part, on the previously placed handful, the strand fastener is readily concealed. Further, the needle covered portions of one handful are supported, out of the channel 26, by the stems of the previous handful. Boughs are placed in the round ring in a similar manner, all around the ring. The stems of the last handful in a ring are pushed under the first handful in the ring.

Additional decorations, such as pine cones, ribbons, and the like can be secured to the decoration, preferably after the boughs have been emplaced, by means of strand attachment at either the buttons 28 or the holes 30.

As illustrated in the above process, the entire process of securing boughs and other decorations to the bough holder, and thus manufacture of the secured assembly of parts, can be accomplished without ever having to pick up the holder 10, and without having to pass any strand fastener behind the holder 10, whereby the conventional constant moving of the partially assembled article, as it is being assembled, is not necessary with use of the bough holders of this invention. Of course, the bough holder is moved if an assembly element (e.g. ribbon) is secured to the assemblage using holes 30. However, that is optional, as buttons 28 can readily be used for securement as well.

Bough holder 10 is typically made of plastic. Strand fastener 38 is typically plastic, cloth, or nylon.

Figure 4:
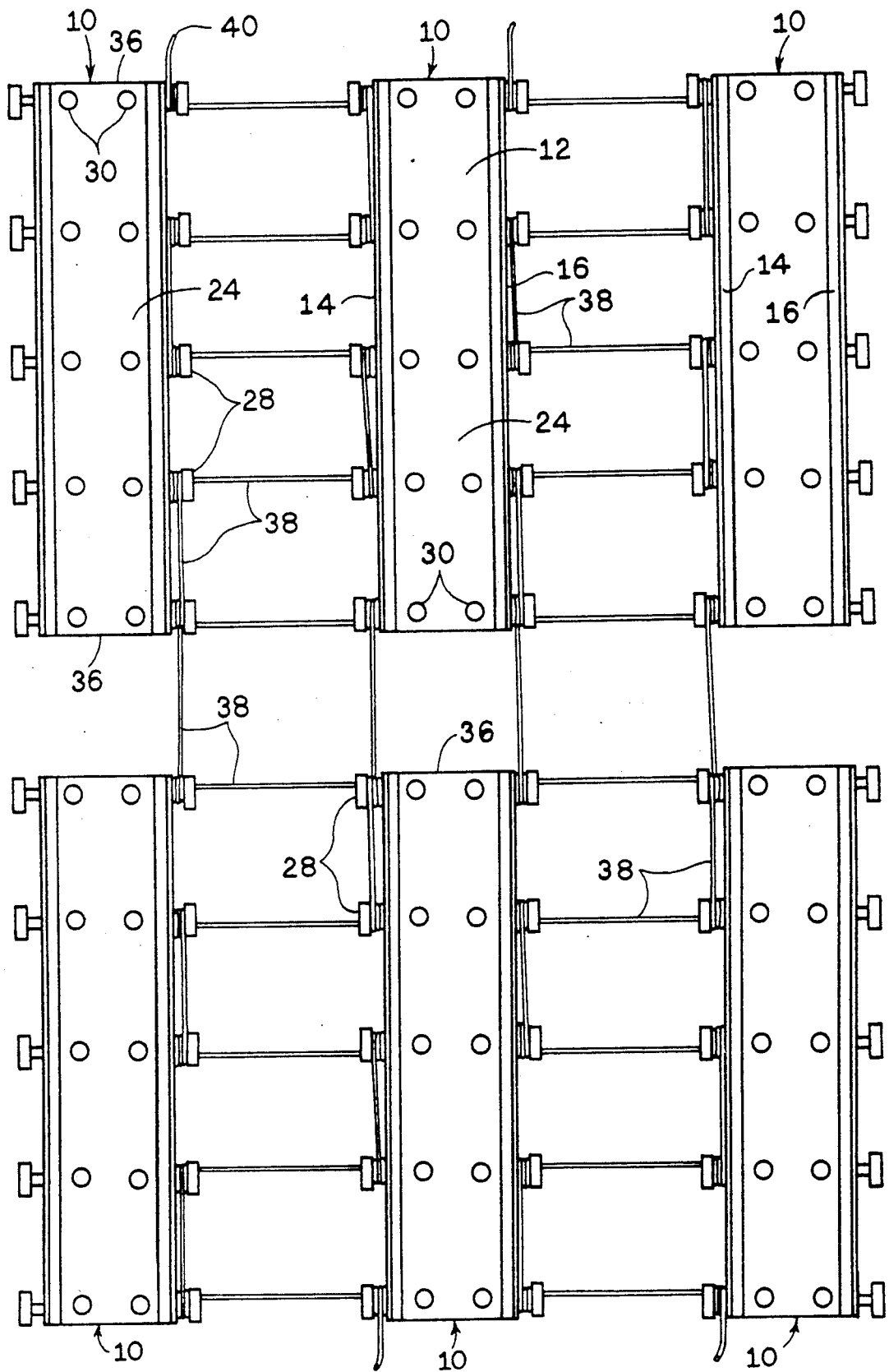
FIG. 4 is a top view of a side-by-side assemblage of bough holders of this invention.

To make a grave blanket, or other display article of expanded size, a series of bough holders 10 can be fastened together side by side as shown in FIG. 4, as well as end to end, using strand fastener 38 to hold the bough holders together. Strand fastener 38 is also used to hold the boughs (not shown) in the channels 26 of the several bough holders. The finished assembly illustrated in FIG. 4 folds in half lengthwise, then in thirds sideways, because of the flexibility of the strand fasteners 38. The boughs are emplaced in the blanket assembly with some sticks facing up, some facing down. Stems of the boughs can stick out on either end of the several bough holders 10 which are used in making the blanket.

As seen in, for example, FIG. 4, the buttons 28 are adapted to receiving a plurality of wraps of intermediate portions of the continuous strand fastener 38, to thereby secure the boughs to the bough holder, without having to take the strand fastener behind the bough holder, and without having to manipulate, or even handle, the end of the strand fastener in any way.

FIG. 5 shows a foreshortened embodiment of the straight bough holders. Two of the bough holders can be secured to each other as seen in FIGS. 6 and 7, whereby the display article made therewith can have two opposing display surfaces for display in two directions simultaneously. Such a decoration can be hung, for example, in a picture window.

Thus the invention provides a bough holder which facilitates securing the boughs to the holder, and thereby making decorative bough display articles.

The invention provides a bough holder which has a receiving pocket dimensioned to receive the bough branches and to confine them while the boughs themselves are being secured to the bough holder.

The invention also provides the bough holder with fastening means on the bough receiving pocket, whereby the fastening means are adapted to receiving wraps of intermediate portions of a continuous strand fastener, and thereby securing the boughs to the bough holder, without having to take the strand fastener behind the bough holder.

Further, the invention provides such a bough holder which is easy and simple to work with, and which can be employed to produce the decorative bough display articles faster and with less stress and strain on the worker.

Finally, since the forked needle covered portions of the boughs are supported on top of the channel 26, fewer boughs are needed in construction of the display articles made therewith.

Having this described the invention, what is claimed is:

1. A bough holder, for making decorative displays with evergreen boughs, said bough holder comprising:
    (a) a pocket, said pocket generally comprising an elongated channel structure, said channel structure having a bottom, walls extending upwardly from said bottom, and an open top, the interior of said channel structure being accessible, for placing articles therein, through said top; and
    (b) a plurality of fastening means on said walls, said fastening means being adapted to receive a wrap of an intermediate portion of a continuous strand fastener.

2. A bough holder as in claim 1 wherein said fastening means comprise buttons extending from said walls.

3. A bough holder as in claim 2, said walls comprising opposing side walls, and wherein ones of said buttons on said opposing side walls extend away from each other.

4. A bough holder as in claim 1, said walls comprising opposing side walls, the distance between said side walls, as measured on the inside of said channel, being greater at said open top than at said bottom.

5. A bough holder assembly, said assembly comprising:
    (a) a plurality of pockets arranged in an array, each said pocket having an elongated dimension thereof, being dimensioned to receive evergreen boughs, and comprising a bottom, walls extending upwardly from said bottom, an open top, and a plurality of fastening means on said walls, said fastening means being adapted to receive a wrap of an intermediate portion of a continuous strand fastener, whereby the continuous strand fastener can used to hold a handful of boughs to said bough holder; and
    (b) elongated strand fastening means extending between said plurality of elongated pockets, and securing said pockets to each other in said array.

6. A bough holder assembly as in claim 5 wherein said strand fastening means is secured to said fastening means on said walls of respective ones of said pockets, and extends between said pockets, and thereby establishes said array.

7. A bough holder assembly, said assembly comprising:
    (a) a first bough holder; and
    (b) a second bough holder,
        each said bough holder having (i) a bottom, (ii) walls extending upwardly from said bottom, and (iii) an open top, each said bough holder comprising elongated dimensions along said bottom and said walls, comprising a channel, said channel being dimensioned to receive evergreen boughs, said first and second bough holders being arranged with said bottoms of said bough holders disposed toward each other, and said tops of said bough holders being disposed away from each other, said first and second bough holders being held to each other, said first and second bough holders comprising fastening means on said walls, said fastening means being adapted to receive a wrap of an intermediate portion of a continuous strand fastener.

8. A bough holder assembly as in claim 7, said first and second bough holders being secured to each other by strand fastener means extending between said fastening means on said first bough holder and said fastening means on said second bough holder, whereby said first and second bough holders are securely held to each other.

* * * * *